United States Patent
Cofer, Jr.

(10) Patent No.: US 11,649,851 B2
(45) Date of Patent: May 16, 2023

(54) CRANKSHAFT THRUST BEARING

(71) Applicant: Cummins Inc., Columbus, IN (US)

(72) Inventor: Stephen D. Cofer, Jr., Sugar Grove, PA (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/198,912

(22) Filed: Mar. 11, 2021

(65) Prior Publication Data

US 2021/0199152 A1    Jul. 1, 2021

Related U.S. Application Data

(63) Continuation of application No. PCT/US2019/054182, filed on Oct. 2, 2019.

(60) Provisional application No. 62/741,052, filed on Oct. 4, 2018.

(51) Int. Cl.
*F16C 9/02* (2006.01)
*F16C 33/04* (2006.01)
*F16C 17/04* (2006.01)

(52) U.S. Cl.
CPC ............. *F16C 9/02* (2013.01); *F16C 17/04* (2013.01); *F16C 33/046* (2013.01); *F16C 2360/22* (2013.01)

(58) Field of Classification Search
CPC ...... F16C 9/02; F16C 17/04–08; F16C 17/10; F16C 17/12; F16C 33/046; F16C 2360/22
See application file for complete search history.

(56) References Cited

U.S. PATENT DOCUMENTS

| | | | |
|---|---|---|---|
| 3,476,446 A | * | 11/1969 | Neilson .............. F16C 17/18 175/371 |
| 4,017,127 A | * | 4/1977 | Smith .............. F16C 17/10 384/294 |
| 6,149,310 A | | 11/2000 | Ono et al. |
| 8,449,193 B2 | | 5/2013 | Kuwabara et al. |
| 9,677,612 B2 | | 6/2017 | Gustafson et al. |
| 9,863,462 B2 | | 1/2018 | Tanaka et al. |
| 2010/0192571 A1 | | 8/2010 | Boning et al. |
| 2014/0003917 A1 | * | 1/2014 | Schneider .............. F01D 25/166 415/171.1 |
| 2015/0252845 A1 | | 9/2015 | Gustafson et al. |
| 2015/0308494 A1 | | 10/2015 | Kleinschmidt et al. |

(Continued)

FOREIGN PATENT DOCUMENTS

| | | |
|---|---|---|
| GB | 1467689 | 3/1977 |
| WO | 2016164461 | 10/2016 |
| WO | 2018041397 | 3/2018 |

OTHER PUBLICATIONS

"Chamfer" Webpage: https://www.wikiwand.com/en/Chamfer (Year: 2015).*

(Continued)

*Primary Examiner* — Alan B Waits
(74) *Attorney, Agent, or Firm* — Taft, Stettinius & Hollistor LLP

(57) ABSTRACT

Improved engine crankshaft thrust bearing includes an arrangement in which the thrust bearing can be employed with a first type of crankshaft for a replacement engine block and also with a different, second type of crankshaft that can also be employed in the replacement engine block. The second type of crankshaft was previously used in the engine block being replaced.

18 Claims, 3 Drawing Sheets

(56) References Cited

U.S. PATENT DOCUMENTS

| | | |
|---|---|---|
| 2016/0032961 A1 | 2/2016 | Tanaka et al. |
| 2016/0091022 A1 | 3/2016 | Kamiya et al. |
| 2017/0058943 A1* | 3/2017 | Tanaka .................... F16C 17/10 |
| 2017/0108041 A1 | 4/2017 | Mayer |

OTHER PUBLICATIONS

International Search Report and Written Opinion issued in correspondence international application No. PCT/US2019/54182, dated Jan. 6, 2020, 10 pp.

* cited by examiner

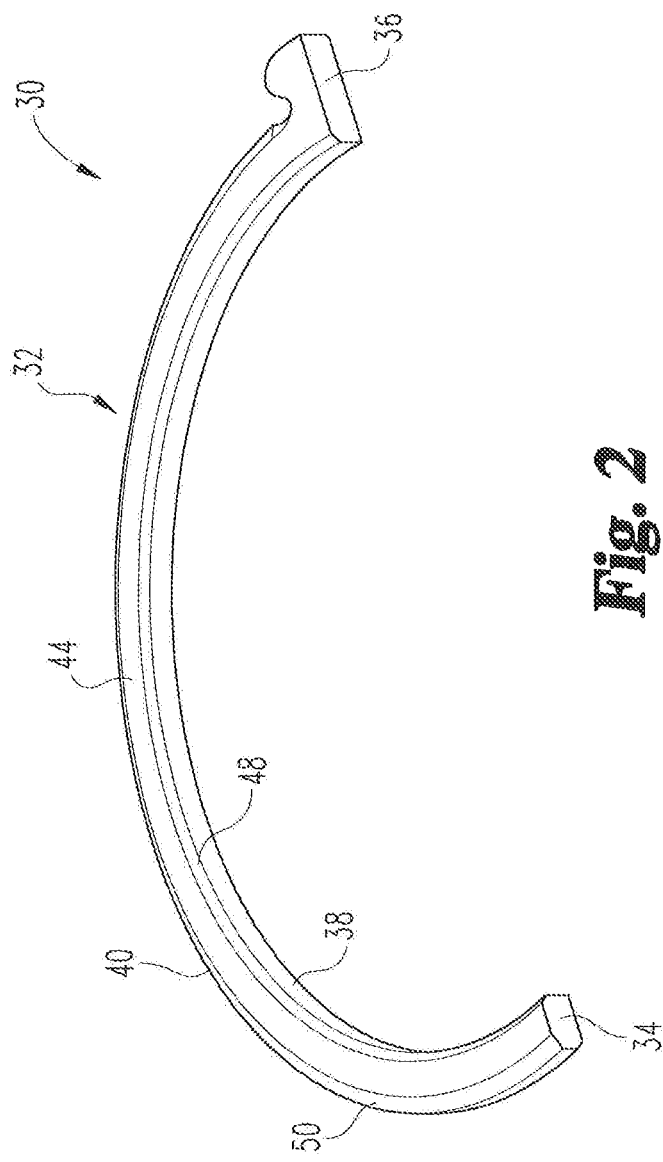
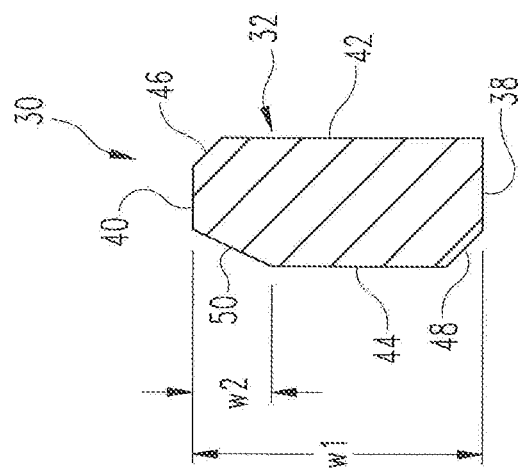
Fig. 2
Fig. 3

CRANKSHAFT THRUST BEARING

CROSS-REFERENCE TO RELATED APPLICATION

The present application is a continuation of International Patent Application No. PCT/US19/54182 filed on Oct. 2, 2019, which claims the benefit of the filing date of U.S. Provisional Application Ser. No. 62/741,052 filed on Oct. 4, 2018, each of which is incorporated herein by reference in its entirety.

TECHNICAL FIELD

This disclosure is directed to an improved thrust bearing for a crankshaft. More particularly, the present invention relates to a crankshaft thrust bearing that is compatible with more than one type of crankshaft.

BACKGROUND

A thrust bearing is used for minimizing axial movement of a crankshaft in an internal combustion engine. For example, in FIG. 1 there is shown an engine block 10. Engine block 10 includes a first thrust pocket 26 that receives a first thrust bearing 12 and a second thrust pocket 28 that receives a second thrust bearing 14. Thrust bearings 12, 14 also bear against opposite bearing surfaces 16, 18, respectively, of the engine block 10. A crankshaft 20 can be positioned in engine block 10 with portions 22, 24 of the crankshaft 20 located on opposite sides of the thrust bearings 12, 14.

Modern engine requirements can demand higher thrust capacity for the crankshaft thrust bearings. Therefore, crankshaft thrust bearing designs are required to accommodate the higher thrust capacity. In addition, engine overhauls can require the replacement of a cylinder block even if the crankshaft need not be replaced. The new engine block may not be compatible with the existing crankshaft and its associated thrust bearings. Thus, the existing crankshaft may not be able to be re-used with the new engine block. Therefore, further improvements in this area are needed.

SUMMARY

An improved thrust bearing assembly for a crankshaft includes an arrangement in which the thrust bearing can be employed with a first type of crankshaft for a replacement engine block and with a second type of crankshaft being employed in the replacement engine block. In one embodiment, the second type of crankshaft was previously used in the engine block being replaced. The replacement engine block can be configured differently from the engine being replaced.

In one embodiment, the thrust bearing includes a semi-circular shaped bearing body with two sets of opposing faces extending from a first end of the bearing body to a second end of the bearing body. The thrust bearing includes a first set of the opposing faces with a radially outwardly facing surface and a radially inwardly facing surface, and a second set of the opposing faces that include axially outwardly opposing faces. A ramped surface portion is provided on one of the axially outwardly opposing faces of the body of the thrust bearing and extends to the radially outwardly facing surface of the body.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

FIG. 2 is a perspective view of a thrust bearing according to the present disclosure.

FIG. 3 is a cross-sectional illustration of the thrust bearing of FIG. 2.

DETAILED DESCRIPTION

Figure 1:
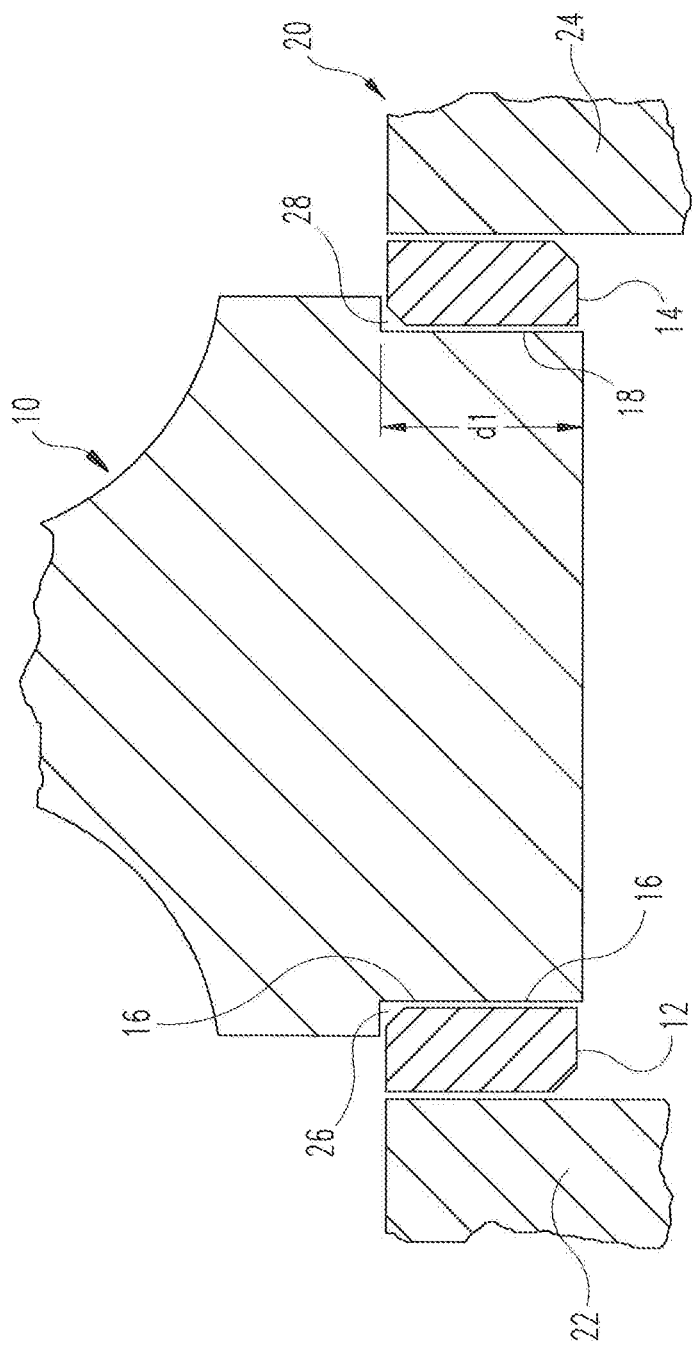
FIG. 1 is a cross-sectional illustration of a bearing assembly including a prior art engine block and thrust bearing.

For the purpose of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein that would normally occur to one skilled in the art to which the invention relates are contemplated herein.

As shown in FIGS. 2-3, one embodiment of the present disclosure includes a thrust bearing 30. Thrust bearing 30 can be employed as an upper half or lower half thrust bearing in a crankshaft assembly within an engine block. Thrust bearing 30 includes a thrust bearing body 32 that is semi-circular in shape and extends between a first end 34 and an opposite second end 36.

The half thrust bearing body 32 includes a first set of radially opposing faces that define radially inwardly and outwardly facing surfaces 38, 40, respectively. Body 32 also includes a second set of axially facing opposing faces 42 and 44, of which axial face 44 includes a ramped surface portion 50. Ramped surface portion 50 extends from face 44 to the radially outwardly facing surface 40. Body 32 also includes a first chamfered surface portion 46 and a second chamfered surface portion 48. First chamfered surface portion 46 extends from axial face 42 to radially outwardly facing surface 40, and second chamfered surface portion 48 extends from axial face 44 to radially inwardly facing surface 38.

As shown in FIG. 3, body 32 includes a width w1 between the radially inwardly and outwardly facing surfaces 38, 40. Ramped surface portion 50 includes a width w2 from radially outwardly facing surface 40 to axially facing surface 44. In one embodiment, width w2 ranged from 25% to 50% of width w1, or from about 25% to about 50% of width w1 in another embodiment. The ramped surface portion 50 also extends along body 32 from first end 34 to or near second end 34.

Figure 4:
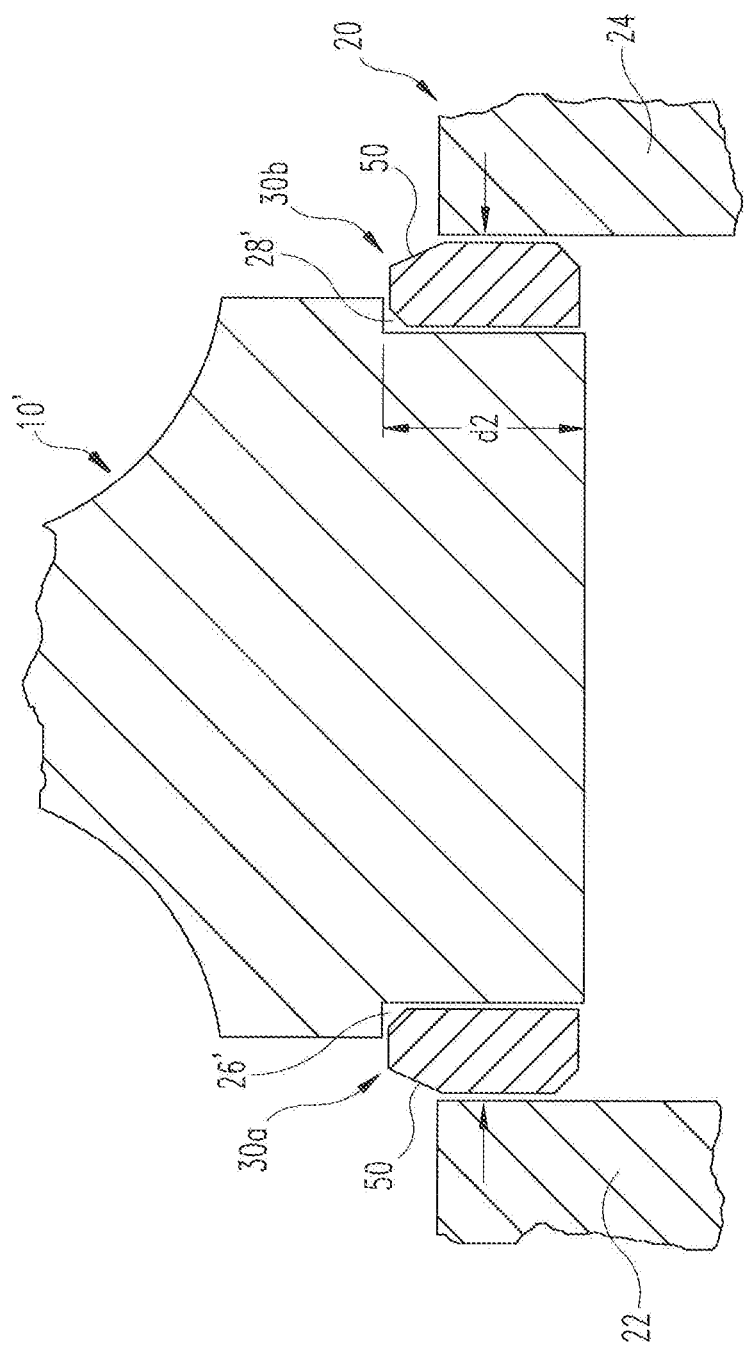
FIG. 4 is a cross-sectional illustration of a bearing assembly including the thrust bearing of FIG. 2 between another embodiment engine block and crankshaft.

Referring to FIG. 4, another embodiment engine block 10' is shown that is similar to engine block 10 of FIG. 1 but includes thrust pockets 26', 28' that have a depth d2 that is deeper than a depth d1 of the thrust pockets 26, 28 of block 10. The increased depth d2 provides a greater surface area for transfer of thrust forces to the engine block 10' than is provided with engine 10. However, the same crankshaft 20 can be employed in either of engine block 10 or engine block 10'. Alternatively, a new crankshaft (not shown) could also be employed.

In addition, first and second thrust bearings 30a, 30b, which correspond to thrust bearing 30 discussed above, are position in the thrust pockets 26', 28'. The thrust bearings 30a, 30b include a width w1 that is sized to substantially occupy the depth d2 of the thrust pockets 26', 28'. The thrust bearings 30a, 30b are positioned so that ramped surface portions 50 are positioned to be oriented toward the crankshaft portions 22, 24 of the crankshaft 20. The ramped surface portions 50 are provided so that the crankshaft 20 cannot wear a groove into the thrust bearing 30.

Many aspects of the present invention are envisioned. For example, one aspect is directed to a bearing assembly that includes a semi-circular shaped bearing body with two sets of opposing faces extending from a first end of the bearing body to a second end of the bearing body. A first set of the opposing faces includes a radially outwardly facing surface and a radially inwardly facing surface. A second set of the opposing faces includes axially outwardly opposing faces. A ramped surface portion on one of the axially outwardly opposing faces of the bearing body extends to the radially outwardly facing surface.

In one embodiment, the ramped surface portion extends from the first end of the bearing body to the second end of the bearing body. In another embodiment, the body includes a width between the radially outwardly facing surface and the radially inwardly facing surface and the ramped surface portion extends across 25% to 50% of said width.

In a further embodiment, a chamfered surface portion is provided on the other of the axially outwardly opposing faces of the bearing body that extends to the radially outwardly facing surface. In a refinement of this embodiment, an engine block and a crankshaft are provided and the chamfered surface is positioned toward the engine block and the ramped surfaced is positioned toward the crankshaft. In another refinement, a second chamfered surface portion is provided on one of the axially outwardly opposing faces of the bearing body that extends to the radially inwardly facing surface.

According to another aspect, an apparatus includes an internal combustion engine block and a crankshaft having associated thrust bearings that are supported in said engine block. At least one of the thrust bearings includes a semi-circular shaped bearing body with two sets of opposing faces. A first set of the opposing faces includes a radially outwardly facing surface and a radially inwardly facing surface, and a second set of the opposing faces includes axially outwardly facing surfaces. One of the axially outwardly opposing faces of the bearing body is oriented toward the crankshaft and includes a ramped surface portion that extends to the radially outwardly facing surface.

In one embodiment, the ramped surface portion extends from the first end of the bearing body to the second end of the bearing body. In another embodiment, the body includes a width between the radially outwardly facing surface and the radially inwardly facing surface and the ramped surface portion extends across 25% to 50% of the width.

In yet another embodiment, a chamfered surface portion is provided on the other of the axially outwardly opposing faces of the bearing body extends to the radially outwardly facing surface. In a refinement of this embodiment, a second chamfered surface portion is provided on said one of said axially outwardly opposing faces of said bearing body that extends to said radially inwardly facing surface.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A bearing assembly, comprising:
   a semi-circular shaped bearing body with two sets of opposing faces extending from a first end of said bearing body to a second end of said bearing body;
   a first set of the opposing faces including a radially outwardly facing surface and a radially inwardly facing surface;
   a second set of the opposing faces including axially outwardly opposing faces; and
   a ramped surface portion on one of said axially outwardly opposing faces of said bearing body that extends to said radially outwardly facing surface, wherein said body includes a width between said radially outwardly facing surface and said radially inwardly facing surface and said ramped surface portion extends across 25% to 50% of said width.

2. The bearing assembly of claim 1, wherein said ramped surface portion extends from said first end of said bearing body to said second end of said bearing body.

3. The bearing assembly of claim 1, further comprising a chamfered surface portion on the other of said axially outwardly opposing faces of said bearing body that extends to said radially outwardly facing surface.

4. The bearing assembly of claim 3, further comprising a second chamfered surface portion on said one of said axially outwardly opposing faces of said bearing body that extends to said radially inwardly facing surface.

5. The bearing assembly of claim 1, wherein:
   the one of said axially outwardly opposing faces that includes said ramped surface is for contacting a crankshaft and a first chamfered surface portion on said one of said axially outwardly opposing faces extends to said radially inwardly facing surface; and
   the other of said axially outwardly opposing faces is for contacting an engine block and a second chamfered surface portion on the other of said axially outwardly opposing faces extends to said radially outwardly facing surface.

6. A bearing assembly, comprising:
   a semi-circular shaped bearing body with first opposing faces adjacent second opposing faces extending between a first end of the bearing body to a second end of the bearing body, the first opposing faces including a radially outward face and a radially inward face, and the second opposing faces including axially outward faces; and
   a first ramped surface portion and a plurality of chamfered surface portions on the bearing body, the first ramped surface portion provided on one of the axially outward faces and extending to the radially outward face, wherein the bearing body includes a width between the radially outward face and the radially inward face, and the first ramped surface portion extends across 25% to 50% of the width.

7. The bearing assembly of claim 6, wherein the first ramped surface portion extends from the first end of the bearing body to the second end of the bearing body.

8. The bearing assembly of claim 6, wherein:
a first chamfered surface portion of the plurality of chamfered surface portions is provided on the other of the axially outward faces and extends to the radially outward face;
the one of said axially outwardly opposing faces that includes said ramped surface portion is for contacting a crankshaft; and
the other of said axially outwardly opposing faces with said first chamfered surface portion is for contacting an engine block.

9. The bearing assembly of claim 8, wherein a second chamfered surface portion of the plurality of chamfered surface portions is provided on the one of the axially outward faces and extends to the radially inward face.

10. An apparatus comprising:
an internal combustion engine block and a crankshaft having associated thrust bearings that are supported in said engine block;
wherein at least one of said thrust bearings includes a semi-circular shaped bearing body with two sets of opposing faces;
a first set of the opposing faces including a radially outwardly facing surface and a radially inwardly facing surface;
a second set of the opposing faces including axially outwardly facing surfaces; and
wherein one of said axially outwardly opposing faces of said bearing body is oriented toward said crankshaft and includes a ramped surface portion that extends to said radially outwardly facing surface and is positioned toward the crankshaft such that a majority of the ramped surface portion extends radially beyond a radially outermost portion of the crankshaft.

11. The apparatus of claim 10, wherein:
said ramped surface portion extends from said first end of said bearing body to said second end of said bearing body;
said engine block includes a thrust pocket having a depth;
said at least one of said thrust bearings includes a width between said radially outwardly facing surface and said radially inwardly facing surface; and
said width is sized so that said at least one of said thrust bearings occupies said depth of said thrust pocket.

12. The apparatus of claim 10, wherein said body includes a width between said radially outwardly facing surface and said radially inwardly facing surface and said ramped surface portion extends across 25% to 50% of said width.

13. The apparatus of claim 10, further comprising a chamfered surface portion on the other of said axially outwardly opposing faces of said bearing body that extends to said radially outwardly facing surface.

14. The apparatus of claim 13, further comprising a second chamfered surface portion on said one of said axially outwardly opposing faces of said bearing body that extends to said radially inwardly facing surface.

15. An apparatus, comprising:
an internal combustion engine block and a crankshaft having associated thrust bearings that are supported in said engine block,
at least one of said thrust bearings including:
a semi-circular shaped bearing body with two sets of opposing faces extending from a first end of said bearing body to a second end of said bearing body;
a first set of the opposing faces including a radially outwardly facing surface and a radially inwardly facing surface;
a second set of the opposing faces including axially outwardly opposing faces;
a ramped surface portion on one of said axially outwardly opposing faces of said bearing body that extends to said radially outwardly facing surface; and
a chamfered surface portion on the other of said axially outwardly opposing faces of said bearing body that extends to said radially outwardly facing surface, wherein said chamfered surface is positioned toward the internal combustion engine block and said ramped surface is positioned toward the crankshaft such that a majority of the ramped surface extends radially beyond a radially outermost portion of the crankshaft.

16. The apparatus of claim 15, wherein:
said ramped surface portion extends from said first end of said bearing body to said second end of said bearing body;
said engine block includes a thrust pocket having a depth;
said at least one of said thrust bearings includes a width between said radially outwardly facing surface and said radially inwardly facing surface; and
said width is sized so that said at least one of said thrust bearings occupies said depth of said thrust pocket.

17. The apparatus of claim 15, wherein said body includes a width between said radially outwardly facing surface and said radially inwardly facing surface and said ramped surface portion extends across 25% to 50% of said width.

18. The apparatus of claim 15, further comprising a second chamfered surface portion on said one of said axially outwardly opposing faces of said bearing body that extends to said radially inwardly facing surface.

* * * * *